United States Patent
Hobson (10) Patent No.: US 9,483,103 B2
(45) Date of Patent: Nov. 1, 2016

(54) PROCESS STATE OF A COMPUTING MACHINE

(75) Inventor: Louis B. Hobson, Tomball, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1446 days.

(21) Appl. No.: 12/910,483

(22) Filed: Oct. 22, 2010

(65) Prior Publication Data

US 2012/0102347 A1     Apr. 26, 2012

(51) Int. Cl.
  G06F 9/46      (2006.01)
  G06F 1/32      (2006.01)
  G06F 9/44      (2006.01)

(52) U.S. Cl.
  CPC .......... G06F 1/3287 (2013.01); G06F 1/3275 (2013.01); G06F 9/4418 (2013.01); G06F 9/461 (2013.01); Y02B 60/1228 (2013.01); Y02B 60/1282 (2013.01)

(58) Field of Classification Search
  USPC ................................................. 713/300, 323
  See application file for complete search history.

(56) References Cited

U.S. PATENT DOCUMENTS

| | | | |
|---|---|---|---|
| 6,266,776 B1* | 7/2001 | Sakai ............................ | 713/300 |
| 6,389,556 B1* | 5/2002 | Qureshi .......................... | 714/15 |
| 7,308,587 B2* | 12/2007 | Inui et al. ...................... | 713/310 |
| 7,373,530 B2* | 5/2008 | Judge et al. ................... | 713/300 |
| 7,412,565 B2* | 8/2008 | Wirasinghe et al. .......... | 711/122 |
| 7,594,073 B2* | 9/2009 | Hanebutte et al. ........... | 711/113 |
| 7,681,058 B2* | 3/2010 | Kimura .......................... | 713/323 |
| 7,689,850 B2* | 3/2010 | Cantwell et al. ............. | 713/323 |
| 7,934,111 B2* | 4/2011 | Yamaji .......................... | 713/324 |
| 7,971,081 B2* | 6/2011 | Cooper et al. ................ | 713/320 |
| 8,006,080 B2* | 8/2011 | Yamaji .............................. | 713/2 |
| 8,069,360 B2* | 11/2011 | Yamaji et al. ................ | 713/323 |
| 8,108,704 B2* | 1/2012 | Chen et al. ................... | 713/323 |
| 8,117,476 B2* | 2/2012 | Yamaji .......................... | 713/323 |
| 8,176,305 B2* | 5/2012 | Yamaji .............................. | 713/1 |
| 8,271,814 B2* | 9/2012 | Padmanabhan et al. ..... | 713/310 |
| 2008/0082846 A1* | 4/2008 | Yoshioka et al. ............ | 713/323 |
| 2008/0126815 A1* | 5/2008 | Cantwell et al. ............. | 713/323 |
| 2008/0222410 A1* | 9/2008 | Yamaji .......................... | 713/100 |
| 2009/0172439 A1 | 7/2009 | Barnes et al. | |
| 2010/0318817 A1* | 12/2010 | Nanbu .......................... | 713/300 |

* cited by examiner

Primary Examiner — Brian Misiura

(74) Attorney, Agent, or Firm — HP Inc Patent Department (57) ABSTRACT

A computing machine to power a memory to retain a process state of the computing machine if the computing machine is in a sleep state and transfer the process state from the memory to a non-volatile storage device, where the computing machine remains in the sleep state as the process state is transferred from the memory to the non-volatile storage device.

15 Claims, 7 Drawing Sheets

PROCESS STATE OF A COMPUTING MACHINE

BACKGROUND

When a computing machine initially transitions from a power off state to a power on state, one or more processes can be loaded onto the computing machine for use. In response to the computing machine transitioning from the power on state to a sleep state, a process state of the computing machine can be stored. As the computing machine remains in the sleep state, the memory and/or one or more components of the computing machine can continue to be powered so that the process state can continue to be retained. If the computing machine resumes from the sleep state, the process state can be re-loaded for use on the computing machine.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

If a computing machine is in a sleep state, a memory of the computing machine can be powered to retain a process state of the computing machine. As the computing machine remains in the sleep state, the process state can be transferred from the memory to a non-volatile storage device. By transferring the process state while the computing machine is in the sleep state, the computing machine does not resume to a power on state when transferring the process state and the memory can power down as the process state continues to be retained. As a result, a user friendly experience can be created and an amount of power consumed by the computing machine can be reduced by not resuming the computing machine to a power on state when transferring the process state and by powering down the memory in response to the process state being transferred to the non-volatile storage device.

Figure 1:
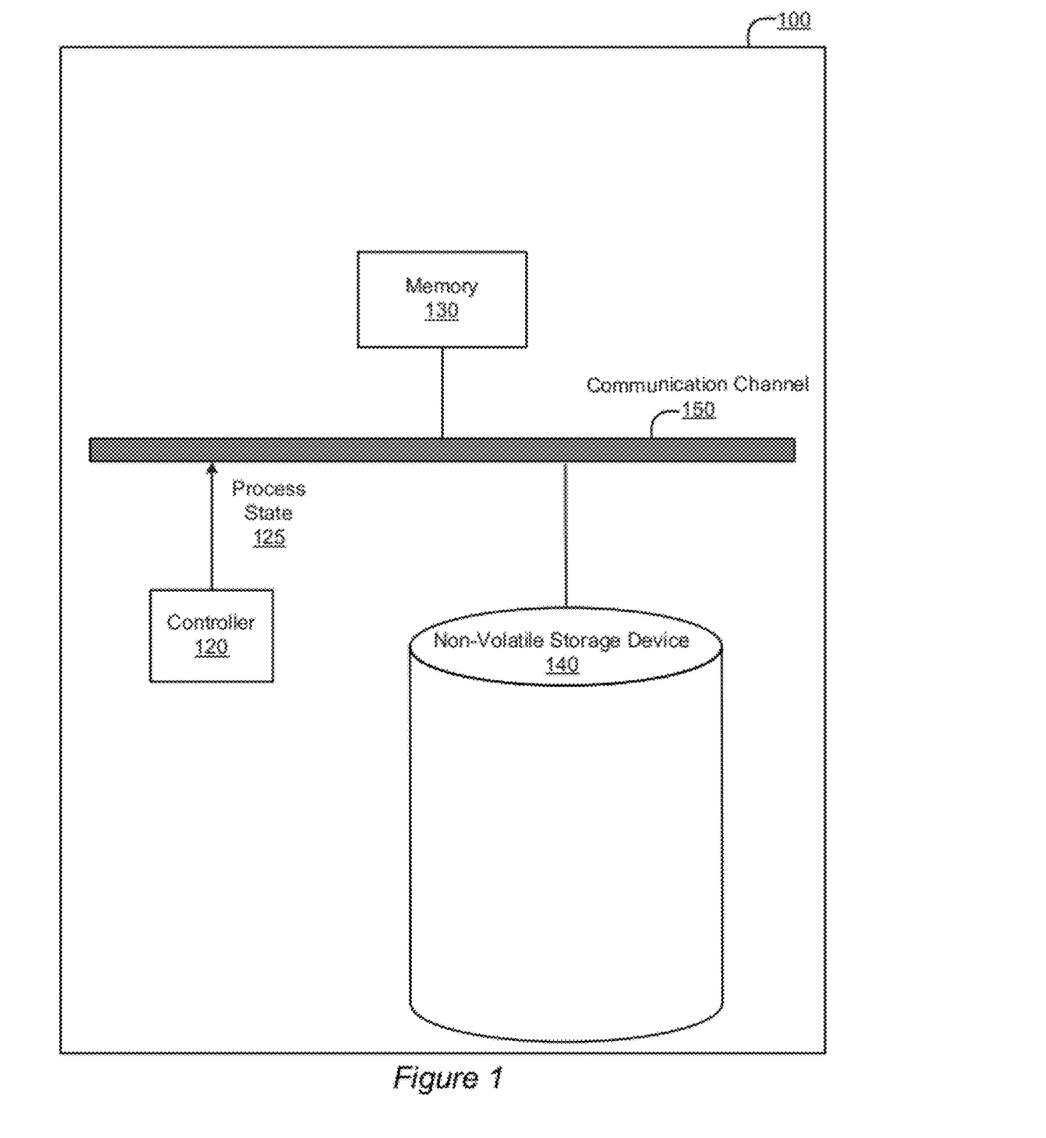
FIG. 1 illustrates a computing machine with a memory and a non-volatile storage device according to an embodiment.

FIG. 1 illustrates a computing machine 100 with a memory 130 and a non-volatile storage device 140 according to an embodiment. In one embodiment, the computing machine 100 is or includes a desktop, a laptop, a notebook, a tablet, a netbook, an all-in-one system, a server, and/or the like. In another embodiment, the computing machine 100 is a cellular device, a PDA, an E-Reader, and/or any additional computing device which can include a memory 130 and a non-volatile storage device 140.

As illustrated in FIG. 1, the computing machine 100 includes a controller 120, a memory 130, a non-volatile storage device 140 and a communication channel 150 for the computing machine 100 and/or one or more components of the computing machine 100 to communicate with one another. In one embodiment, the computing machine 100 includes a power source. In another embodiment, the computing machine 100 also includes a processor and/or a process application. In other embodiments, the computing machine 100 includes additional components and/or is coupled to additional components in addition to and/or in lieu of those noted above and illustrated in FIG. 1.

As noted above, the computing machine 100 can include a controller 120 and/or a processor. The controller 120 and/or the processor can send data and/or instructions to the components of the computing machine 100, such as the memory 130, the non-volatile storage device 140, the power source, and/or the process application. Additionally, the controller 120 and/or the processor can receive data and/or instructions from components of the computing machine 100, such as the memory 130, the non-volatile storage device 140, the power source, and/or the process application.

The process application is an application which can be utilized in conjunction with the controller 120 and/or the processor to manage the computing machine 100. In one embodiment, the process application is an application which includes computer readable code executable by the controller 120 and/or the processor. When the computing machine 100 powers on, the controller 120, the processor, and/or the process application can load an operating system, one or more sessions, processes, threads, and/or applications onto a memory 130 of the computing machine 100. The memory 130 is a device or component of the computing machine 100 which can be powered to store the operating system, one or more sessions, processes, threads, and/or applications. In one embodiment, the memory 130 can be RAM (Random Access Memory).

If the computing machine 100 transitions from a power on state to a sleep state, the memory 130 can remain powered to retain a process state 125 of the computing machine 100 in the memory 130. For the purposes of this application, the process state 125 of the computing machine 100 can include a state of the operating system, the sessions, the processes, the threads, and/or the applications which are loaded onto the memory 130. Additionally, the process state 125 can include information, data, and/or configuration settings associated with the loaded operating system, sessions, processes, threads, and/or applications.

In one embodiment, the computing machine 100 can be in a power on state and a document editing application can be loaded for use on an operating system X of the computing machine 100. When loaded for use on the computing machine 100, the document editing application and operating system X or a portion of operating system X can be loaded onto the memory 130. If the computing machine 100 transitions from the power on state to a sleep state, the memory 130 can continue to be powered such that the process state 125 (the state of operating system X and the document editing application) can be retained.

The computing machine 100 is in a power on state if the memory 130, the controller 120, and/or the processor are powered on and the operating system, one or more sessions, processes, threads, and/or applications are loaded onto the memory 130 for use. The computing machine 100 is in a sleep state if the memory 130 initially remains powered and one or more components of the computing machine 100 are powered down and/or not in use.

If the computing machine 100 remains in the sleep state, the process state 125 can be transferred from the memory 130 to a non-volatile storage device 140. The non-volatile storage device 140 is a component of the computing machine 140 configured to receive and store the process state 125 of the computing machine 100. The non-volatile storage device 140 can store or retain the process state 125 without being powered. By transferring the process state 125 from the memory 130 to the non-volatile storage device 140, the memory 130 and one or more additional components of the computing machine 100 can be powered down. As a result, the process state 125 of the computing machine 100 can be retained while an amount of power used by the computing machine 100 can be reduced as opposed to if the memory 130 was to continue to be powered to retain the process state 125.

In one embodiment, if the computing machine 100 is resuming from the sleep state, the process state 125 can be written or transferred from the non-volatile storage device 140 to the memory 130. The controller 120, the processor, and/or the process application 110 can then use the process state 125 to resume operation of the operating system X, the document editing application and/or any additional sessions, processes, threads, and/or applications loaded onto the memory 130.

The process application can be firmware which is embedded onto the controller 120, the processor, the computing machine 100, and/or the storage device of the computing machine 100. In another embodiment, the process application is an application stored on the computing machine 100 within ROM or on the storage device accessible by the computing machine 100. In other embodiments, the process application is stored on a computer readable medium readable and accessible by the computing machine 100 or the storage device from a different location.

Additionally, in one embodiment, the storage device is included in the computing machine 100. In other embodiments, the storage device is not included in the computing machine 100, but is accessible to the computing machine 100 utilizing a network interface included in the computing machine 100. The network interface can be a wired or wireless network interface card. In other embodiments, the storage device can be configured to couple to one or more ports or interfaces on the computing machine 100 wirelessly or through a wired connection.

In a further embodiment, the process application is stored and/or accessed through a server coupled through a local area network or a wide area network. The process application communicates with devices and/or components coupled to the computing machine 100 physically or wirelessly through a communication bus 150 included in or attached to the computing machine 100. In one embodiment the communication bus 150 is a memory bus. In other embodiments, the communication bus 150 is a data bus.

Figure 2:
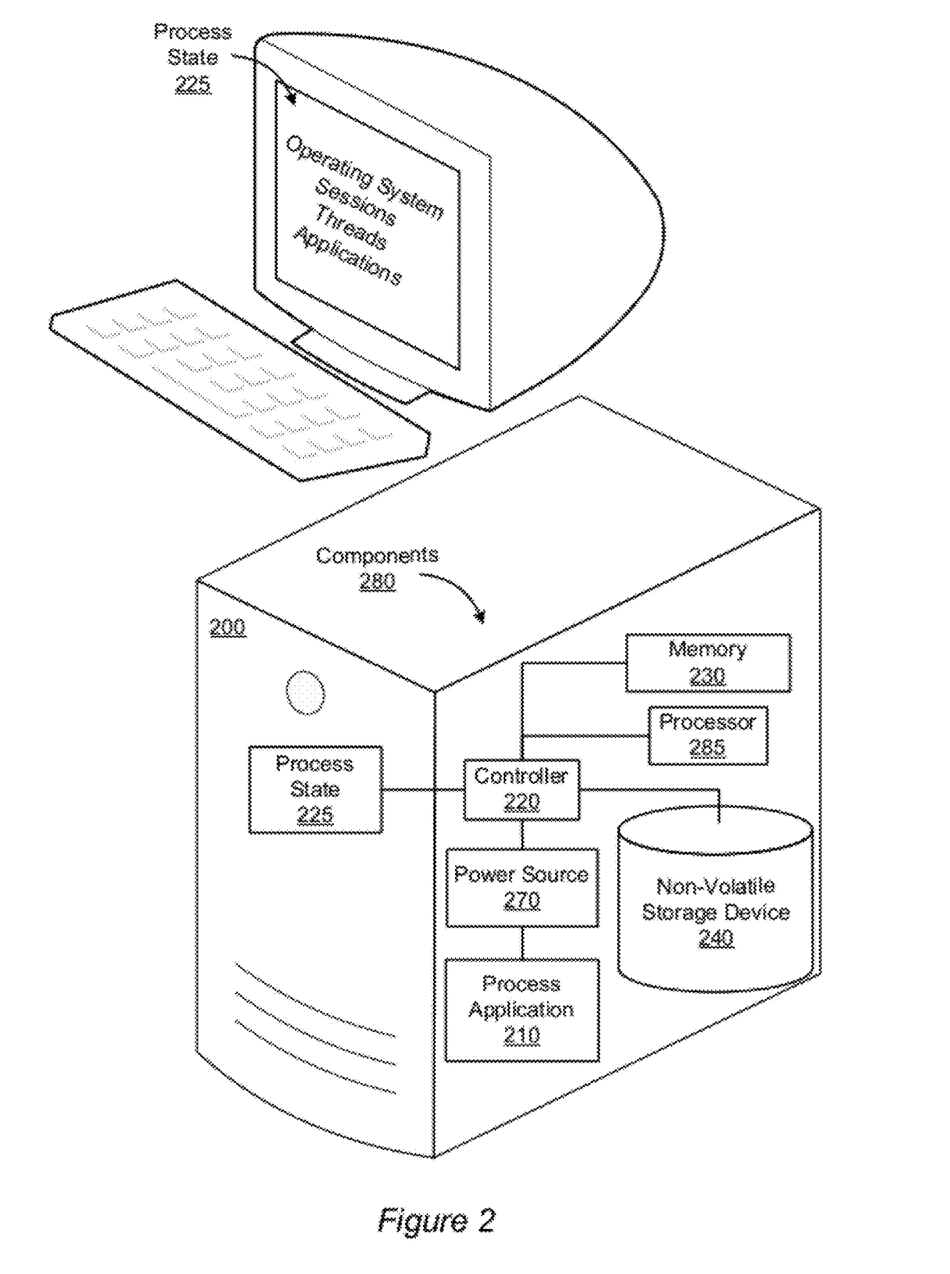
FIG. 2 illustrates a power source coupled to components of a computing machine and a process state of the computing machine according to an embodiment.

FIG. 2 illustrates a power source 270 coupled to components 280 of a computing machine 200 and a process state 225 of the computing machine 200 according to an embodiment. The computing machine 200 can enter into and/or transition between one or more power states in response to a power source 270 of the computing machine 200 modifying an amount of power supplied to one or more components 280 of the computing machine 200.

The power source 270 is a component or device of the computing machine 200 configured to manage, control, and/or modify an amount of power supplied to one or more of the components 280 to allow the computing machine 200 to enter and/or transition between one or more power states. In one embodiment, the power source 270 can be a power supply of the computing machine 200.

The power source 270 can utilize ACPI (Advanced Configuration and Power Interface) specifications. For the purposes of this application, one or more of the power states can include a power on state (S0), a sleep state (S3), and/or a power off state (S5). In other embodiments, the computing machine 200 can utilize difference specifications and the computing machine 200 enter into and/or transition between one or more other power states in addition to and/or in lieu of those noted above.

As noted above, when in the power on state, the power source 270 can supply power to the components 280 of the computing machine 200, such as a controller 220, a processor 285, a memory 230, and/or a non-volatile storage 240. Additionally, when in the power on state, a state of an operating system, one or more sessions, processes, threads, and/or applications of the computing machine 200 can be loaded onto a memory 230 of the computing machine 200 by the controller 220, the processor 285, and/or the process application 210. In one embodiment, data, information, and/or configuration settings associated with the loaded operating system, processes, threads, and/or application can also be loaded onto the memory 230.

The memory 230 is a volatile storage component of the computing machine 200 which can receive power from the power source 270 to store the loaded operating system, sessions, processes, threads, applications, and/or any of the associated data, information, and/or configuration settings. In one embodiment, the memory 230 includes RAM (Random Access Memory).

As noted above, the computing machine 200 can transition from the power on state to a sleep state. If transitioning to a sleep state, the power source 270 can initially continue to supply power to the memory 130 and reduce an amount of power supplied to one or more components of the computing machine 200, such as the processor 220, the controller 285, and/or the non-volatile storage device 240. In response, one or more of the components 280 can power down and the computing machine 200 can enter the sleep state. By continuing to power the memory 130 and reducing an amount of power to one or more other components, a process state 225 of the computing machine 200 can be retained as the computing machine 200 enters the sleep state.

As illustrated in FIG. 2, a process state 225 includes a state of the loaded operating system, the loaded sessions, the loaded threads, and/or the loaded applications which are stored on the memory 230 before the computing machine 200 enters the sleep state. In one embodiment, the process state 225 also includes any information, data, and/or configuration settings used by the loaded operating system, the loaded sessions, the loaded threads, and/or the loaded applications before the computing machine 200 enters the sleep state.

While the computing machine 200 remains in the sleep state, the process state 225 can be transferred from the memory 230 to a non-volatile storage device 240 by the controller 220, the processor 285, and/or the processor application 210. The non-volatile storage device 240 can include a solid state storage device, a flash memory storage device, and/or any hard drive of the computing machine 200 which can receive and/or store the process state 225.

When the process state 225 is transferred from the memory 230 to the non-volatile storage device 240, the computing machine 200 does not load to a BIOS (Basic Input/Output System) of the computing machine 200. In one embodiment, when transferring the process state 225, the controller 220, the processor 285, and/or the process application 210 can create an image file of the process state 225 from the memory 230 and store the image file of the process state 225 onto the non-volatile storage device 240.

By transferring the process state 225 from the memory 230 to the non-volatile storage device 240, the process state 225 can continue to be retained while the power source 270 reduces an amount of power supplied to the memory 230 and one or more components 280 of the computing machine 200. As a result, the memory 230 can power down and an amount of power consumed by the computing machine 200 while in the sleep state can be reduced.

In one embodiment, the process state 225 can be transferred from the memory 230 to the non-volatile storage device 240 after a predefined amount of time. The predefined period of time can be defined by the controller 220, the processor 285, the process application 210, and/or by a user of the computing machine 200. While the computing machine 200 is in the sleep state, the controller 220 and/or the processor 285 can continue to receive an amount of power from the power source 270 to determine whether the predefined amount of time has elapsed. The amount of power supplied to the controller 220 and/or the processor 285 in the sleep state can be less than the amount supplied to the components when in the power on state.

The controller 220 and/or the processor 285 can compare the present time to a time when the computing machine 200 entered the sleep state to determine whether the predefined amount of time has elapsed. Once the predefined amount of time has elapsed, the power source 270 can supply power to the non-volatile storage device 240 and the controller 220, processor 285 and/or the process application 210 proceed to transfer the process state 225 to the non-volatile storage device 240. Once the process state 225 has been transferred, the power source 270 can reduce an amount of power supplied to the memory 230, the controller 220, the processor 280, and/or the non-volatile storage device 240 to allow the components to power down.

As noted above, if the computing machine 200 is in the sleep state, the computing machine 200 can resume to the power on state. The computing machine 200 can resume from the sleep state in response to one or more instructions or wake events being detected by the controller 220, the processor 285, the processor application 210, another component, and/or from a user accessing the computing machine 200. When resuming from the sleep state, the power source 270 can modify and/or increase an amount of power supplied to one or more components 280 of the computing machine 200 to allow the components 280 to awaken.

In one embodiment, the controller 220, the processor 285, and/or the process application 210 can then access the process state 225 from the non-volatile storage device 240 and write or load the process state 225 back to the memory 230. Once the process state 225 has been written to the memory 230, the controller 220, the processor 285, and/or the process application 210 can use the process state 225 to resume operation of the computing machine 200. In one embodiment, resuming operation of the computing machine 200 includes resuming operation of the operating system, sessions, processes, threads, applications, and/or any of the associated data, information, and/or configuration settings which have been reloaded onto the memory 230.

Figure 3A:
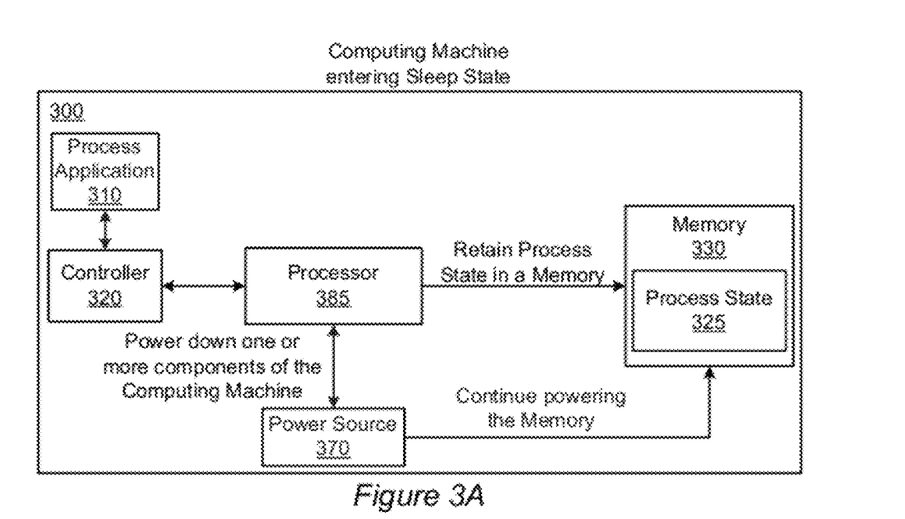
FIG. 3A and FIG. 3B illustrate block diagrams of a process state being retained in a memory and the process state being transferred from the memory to a non-volatile storage device according to an embodiment.

FIG. 3A illustrates a block diagram of a process state 325 being retained in a memory 330 in response to a computing machine 300 entering a sleep state according to an embodiment. As noted above and as illustrated in FIG. 3A, the process state 325 includes one or more operating systems, sessions, processes, threads, applications, and/or any associated data, information, and/or configuration settings which are loaded onto the memory 330.

The computing machine 300 can enter a sleep state in response to an instruction from the processor 385 or the controller 320, a prompt from a user of the computing machine 300, and/or an instruction from another component of the computing machine 300. In another embodiment, the computing machine 300 can automatically enter the sleep state after an amount of time has elapsed or if a power level of the power source 370 is below a threshold.

As noted above, when entering the sleep state, the memory 330 can remain powered while one or more other components of the computing machine 300 are powered down. As illustrated in FIG. 3A, the power source 370 can continue to supply power to the memory 330. As a result, the process state 325 can be retained in the memory 330. Additionally, as illustrated in FIG. 3A, the power source decreases an amount of power supplied to one or more components of the computing machine 300. In response, one or more components of the computing machine 300 can proceed to power down for the computing machine 300 to transition to the sleep state. In one embodiment, the processor 320 and/or a controller continue to receive an amount of power to monitor the computing machine 300 in the sleep state.

Figure 3B:
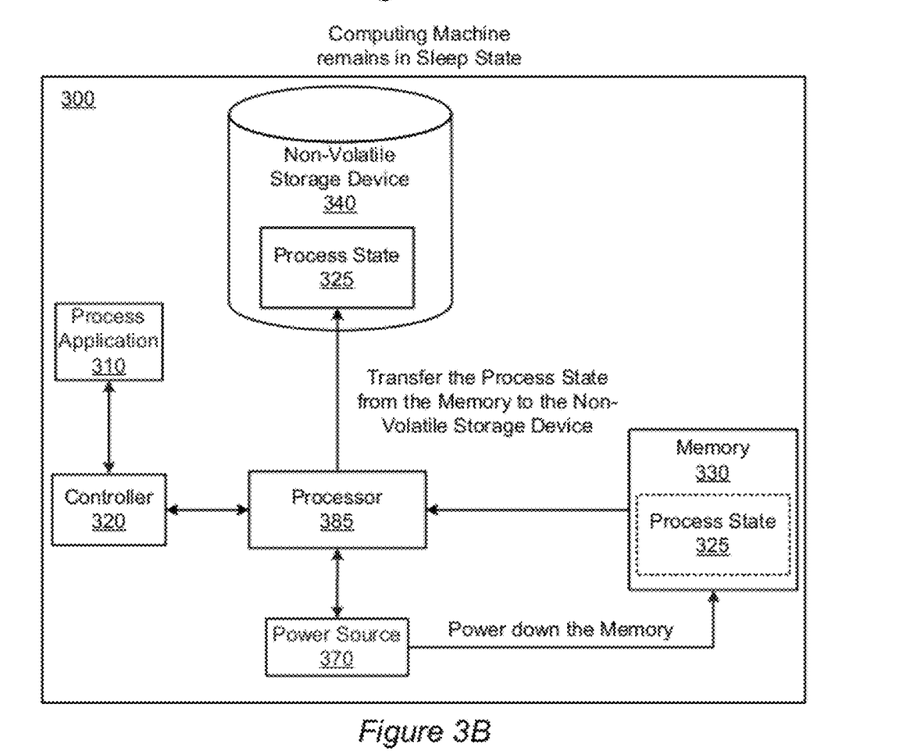

FIG. 3B illustrates a block diagram of a process state 325 being transferred from a memory 330 to a non-volatile storage device 340 if a computing machine 300 remains in a sleep state according to an embodiment. As noted above, when transferring the process state 325, the computing machine 300 remains in the sleep state and does not resume to a power on state. As a result, one or more components of the computing machine 300 remain powered down and an amount of power used by the computing machine 300 can be reduced. As illustrated in FIG. 3, the controller 320, the processor 385 and/or the process application 310 can access the process state 325 from the memory 330 and proceed to transfer the process state 325 to a non-volatile storage device 340.

In one embodiment, the process state 325 is transferred after a predefined amount of time has elapsed. As noted above, if the computing machine 300 is in the sleep state, the power source 370 can continue to supply an amount of power to the controller 320 and/or the processor 385 to transfer the process state 325. The amount of power supplied by the power source 370 can be less than if the computing machine 300 was in a power state. The controller 320 and/or the processor 385 can monitor the time to determine whether the predefined amount of time has elapsed. The predefined amount of time has elapsed if a difference between a current time and the time when the computing machine 300 entered the sleep state is greater than the predefined amount of time.

When transferring the process state 325, the power source 370 can supply power to the non-volatile storage device 340. The controller 320 and/or the processor 385 can transfer each operating system state, process, thread, application, and/or any associated data, information and/or configuration setting which are loaded onto the memory 330 to the non-volatile storage device 340. In another embodiment, the processor 320 and/or the controller can create an image file of the state of the operating system, the processes, the threads, the applications, and/or any associated data, information and/or configuration settings which are loaded onto the memory 330. The controller 320 and/or the processor 385 can then transfer the image file of the process state 325 to the non-volatile storage device 340.

Once the process state 325 has been transferred to the non-volatile storage device 340, the power source 370 can reduce an amount of power supplied to the memory 330 for the memory 330 to power down. The power source 370 can also reduce an amount of power supplied to the controller 320, the processor 385, and/or the non-volatile storage device 340 for the corresponding components to power down. As a result, the process state 325 can continue to be retained in the non-volatile storage device 340, while the memory 330, the controller 320, the processor 385 and/or any additional components power down to reduce an amount of power consumed by the computing machine 300.

In one embodiment, before powering down, the controller 320 and/or the processor 385 can enable a flag on the non-volatile storage device 340. The flag can be a value which can be enabled to indicate that the process state 325 was successfully transferred from the memory 330 to the non-volatile storage device 340. The flag can be stored as a file on the non-volatile storage device 340 or the flag can a section of the non-volatile storage device 340. In one embodiment, when enabling the flag, the controller 320 and/or the processor 385 can mark the value of the flag to be a 1.

Figure 4:
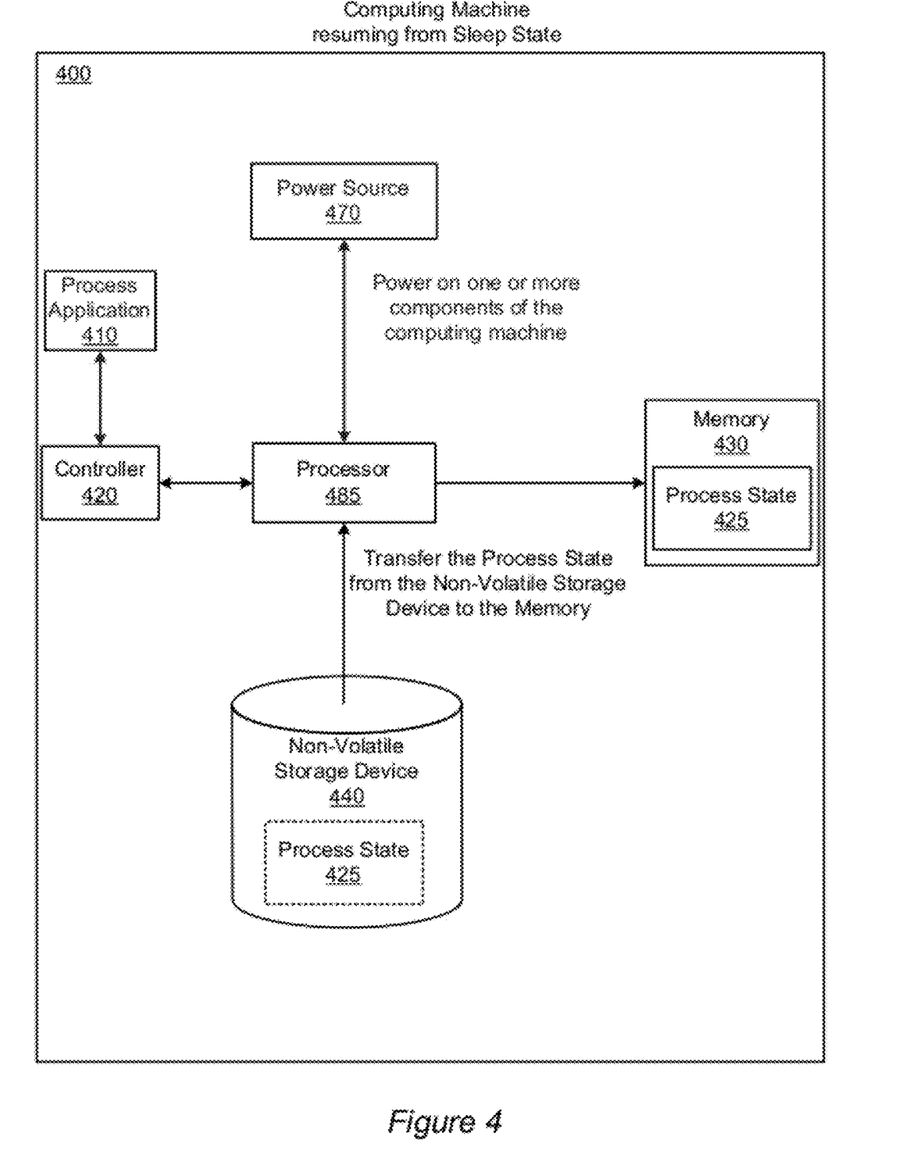
FIG. 4 illustrates a block diagram of a process state being transferred from a non-volatile storage device to a memory in response to a computing machine resuming from a sleep state according to an embodiment.

FIG. 4 illustrates a block diagram of a process state 425 being transferred from a non-volatile storage device 440 to a memory 430 in response to a computing machine 400 resuming from a sleep state according to an embodiment. As illustrated in FIG. 4, the computing machine 400 can resume from a sleep state in response to one or more components of the computing machine 400 powering on. When powering on, a power source 470 can increase an amount of power supplied to one or more of the components.

If the computing machine 400 is resuming from the sleep state, the process state 425 can be retrieved from the non-volatile storage device 440 and written or loaded to the memory 430 of the computing machine 400. By writing the process state 425 to the memory 430, the process state 425 can be reloaded to resume operation of the computing machine 400. In one embodiment, when resuming from the sleep state, the computing machine 400 does not load a BIOS of the computing machine 400. By not reloading the BIOS, an amount of time to resume from the sleep state can be reduced.

The controller 420, the processor 485, and/or the process application 410 can retrieve the process state 425 from the non-volatile storage device 440 and write the process state 425 to the memory 430. In one embodiment, the controller 420 can include a graphical processing unit and the graphical processing unit can retrieve the process state 425 from the non-volatile storage device 440 and write the process state 425 to memory 430. In other embodiments, the processor 485 can include a first core and one or more additional cores. The first core of the processor 420 can retrieve the process state 425 from the non-volatile storage device 440 and the first core can write the process state 425 to the memory 430.

By utilizing the controller 420 and/or a first core of the processor 485 to retrieve and write the process state 425 to memory 430, the controller 420 and/or one or more additional cores of the processor 485 can proceed to initialize one or more components of the computing machine 400. As a result, an amount of time for the computing machine 400 to resume to the power on state can be reduced.

In one embodiment, the processor 485, the controller 420, and/or the process application 410 can initially determine whether the process state 425 is stored on the non-volatile storage device 440. The processor 485, the controller 420, and/or the process application 410 unit can determine whether a flag of the non-volatile storage device 440 is enabled. If the flag is enabled, the process state 425 will be determined to be on the non-volatile storage device 440 and the processor 485, the controller 420, and/or the process application 410 will proceed to retrieve the process state 425 to write to memory 430.

If the flag is not enabled, the process state 425 will be determined to not be on the non-volatile storage device 440 and the controller 420, the processor 485, and/or the process application 410 will load the BIOS. The processor 485, the controller 420, and/or the process application 410 can then proceed to load an operating system, one or more process, one or more threads, and/or one or more applications for use on the computing machine 400.

Figure 5:
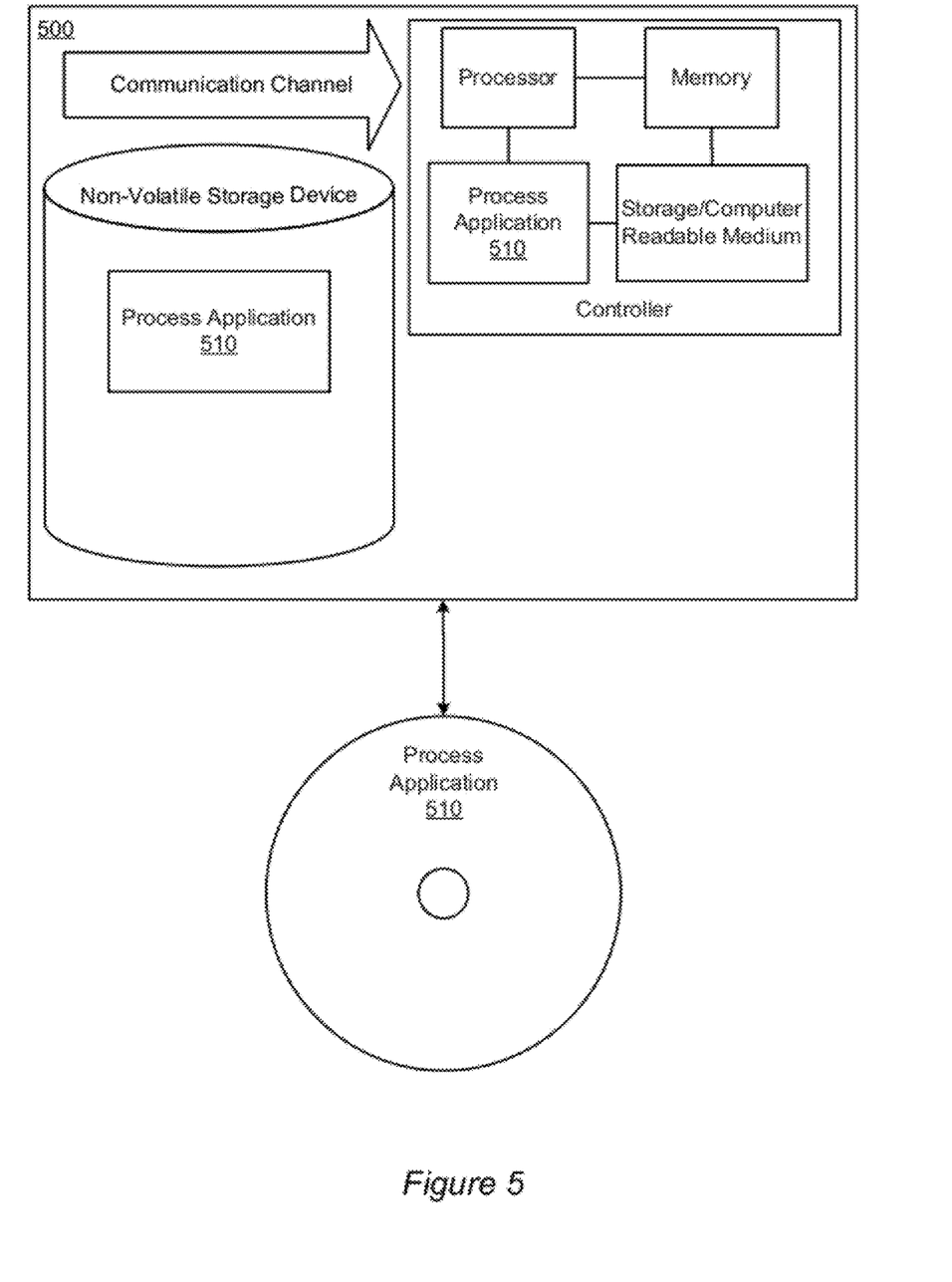
FIG. 5 illustrates a process application on a computing machine and the process application stored on a removable medium being accessed by the computing machine according to an embodiment.

FIG. 5 illustrates a process application 510 on a computing machine 500 and the process application 510 stored on a removable medium being accessed by the computing machine 500 according to an embodiment. For the purposes of this description, a removable medium is any tangible apparatus that contains, stores, communicates, or transports the application for use by or in connection with the computing machine 500. As noted above, in one embodiment, the process application 510 is firmware that is embedded into one or more components of the computing machine 500 as ROM. In other embodiments, the process application 510 is an application which is stored and accessed from a hard drive, a compact disc, a flash disk, a network drive or any other form of computer readable medium that is coupled to the computing machine 500.

Figure 6:
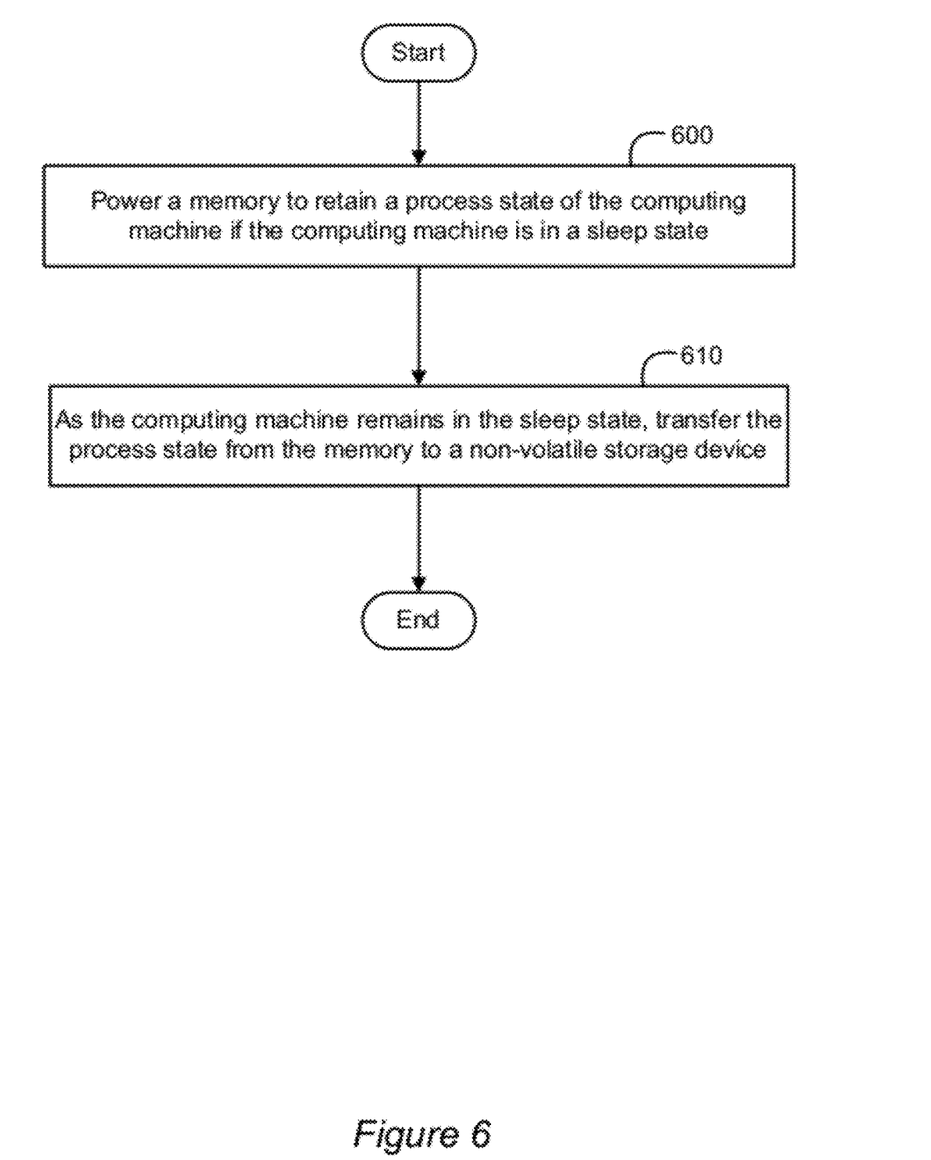
FIG. 6 is a flow chart illustrating a method for managing a computing machine according to an embodiment.

FIG. 6 is a flow chart illustrating a method for managing a computing machine according to an embodiment. The method of FIG. 6 uses a computing machine with a processor, a power source, a memory, a non-volatile storage device, a controller, a communication channel, and/or a process application. In other embodiments, the method of FIG. 6 uses additional components and/or devices in addition to and/or in lieu of those noted above and illustrated in FIGS. 1, 2, 3, 4, and 5.

As noted above, the power source can modify an amount of power supplied to one or more components of the computing machine for the computing machine to enter and/or transition between one or more power states. One or more of the power states can include a power on state and a sleep state. When in the power on state, one or more of the components of the computing machine can be powered on and an operating system, one or more threads, process, and/or applications can be loaded onto a memory of the computing machine for use. In one embodiment, data, information, and/or configuration settings associated with any loaded operating system, thread, process, and/or application can also be loaded onto the memory. The memory can include volatile memory, such as RAM, which can be powered to retain data or information.

The computing machine can transition from the power on state to a sleep state in response to the power source decreasing an amount of power supplied to one or more components of the computing machine. If the computing machine is in the sleep state, the power source can continue to power the memory to retain a process state of the computing machine 600. The process state includes data and/or information which is loaded onto the memory, such as a state of the operating system, threads, processes, applications, and/or any associated data, information, and/or configuration settings.

As the computing machine remains in the sleep state, the process state can be transferred from memory to a non-volatile storage device 610. As noted above, when transferring the process state from the memory to the non-volatile storage device, the computing machine does not resume from the sleep state. In one embodiment, if in the sleep state, the power source can continue to supply an amount of power to the processor and/or the controller. The amount of power supplied can be less than if the computing machine is powered on. With the power, the processor, the controller, and/or the process application can then transfer the process state from the memory to the non-volatile storage device.

In another embodiment, the process state can be transferred from the memory to the non-volatile storage device after a predefined amount of time. The processor and/or the controller monitor the time to determine whether the predefined amount of time has elapsed. If it has elapsed, the power source can proceed to transfer power to the non-volatile storage device and the process state can be transferred to the non-volatile storage device. Once the process state has been transferred to the non-volatile storage device, the processor and/or the controller can enable a flag of the non-volatile storage device.

The power source can then reduce an amount of power supplied to the memory, the processor, the controller, and/or the non-volatile storage to power down the corresponding components. In one embodiment, if the computing machine is resuming from the sleep state, the process state can be retrieved from the non-volatile storage device and be written or loaded onto the memory of the computing machine. The processor and/or a first core of the processor access the process state from the non-volatile memory and write it to the memory. In another embodiment, the controller or a graphical processing unit included in the controller can be used to retrieve the process state and write it to memory.

In other embodiments, the processor, the controller, and/or the process application can initially determine whether a flag of the non-volatile storage device is enabled before retrieving the process state from the non-volatile storage device. Once the process state has been retrieved to memory, the process state can be used to by the processor, the controller, and/or the process application to resume operation of the computing machine. The method is then complete. In other embodiments, the method of FIG. 6 includes additional steps in addition to and/or in lieu of those depicted in FIG. 6.

Figure 7:
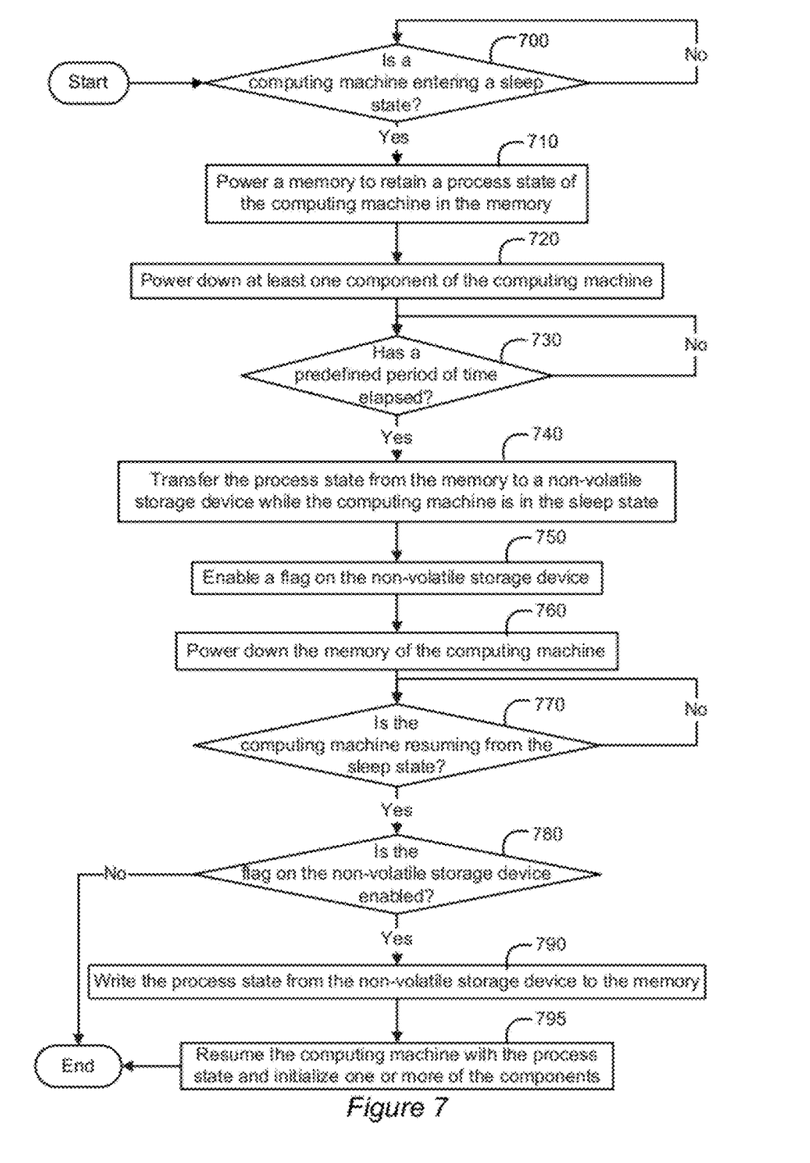
FIG. 7 is a flow chart illustrating a method for managing a computing machine according to an embodiment.

FIG. 7 is a flow chart illustrating a method for managing a computing machine according to another embodiment. Similar to the method disclosed above, the method of FIG. 7 uses a computing machine with a processor, a power source, a memory, a non-volatile storage device, a controller, a communication channel, and/or a process application. In other embodiments, the method of FIG. 7 uses additional components and/or devices in addition to and/or in lieu of those noted above and illustrated in FIGS. 1, 2, 3, 4, and 5.

The processor, the controller and/or the process application can initially determine whether the computing machine is entering a sleep state 700. As noted above, the computing machine can enter the sleep state in response to an instruction from the processor, the process application, the controller, and/or from a user. In another embodiment, the computing machine can enter the sleep state after a predefined period of time or if a power level of the power source is below a threshold. If the computing machine is not detected to enter the sleep state, the processor, the controller, and/or the process application can continue to determine whether the computing machine is entering the sleep state 700.

If the processor, the controller, and/or the process application send an instruction or if one of the previously listed conditions are detected, the computing machine can proceed to enter the sleep state. As noted above, when entering the sleep state, the power source can continue to power a memory of the computing machine to retain a process state of the computing machine in the memory 710. As noted above, the process state includes a state of an operating system, one or more threads, process, applications, and/or any associated data, information, and/or configuration settings which have been loaded onto the memory.

While the power source continues to power the memory, the power source can reduce an amount of power to one or more other components of the computing machine to power down the corresponding components 720. As noted above, the power source can supply an amount of power to the processor and/or the controller. While the computing machine is in the sleep state, the processor and/or the controller determine whether a predefined amount of time has elapsed 730. The predefined amount of time has elapsed if the computing machine has been in the sleep state for greater than the predefined amount of time.

If the predefined amount of time has not elapsed, the processor and/or the controller will continue to poll the time 730. In another embodiment, if the predefined amount of time has elapsed, the power source can supply power the non-volatile storage device and the processor, the controller and/or the process application can proceed to transfer the process state from the memory to a non-volatile storage device 740. The non-volatile storage device is a storage component which can store and retain data or information, such as the process state, without receiving power from the power source. As noted above, when transferring the process state, the computing machine remains in the sleep state.

In one embodiment, the processor and/or the controller can then enable a flag on the non-volatile storage device 750. As noted above, when enabling the flag, the processor and/or the controller can change a value of the flag to 1 or the processor and/or the controller can mark the flag. Once the flag has been enabled, the power source proceeds to decrease an amount of power supplied to the memory, the processor, the controller, and/or the non-volatile storage device. In response, the memory, the processor, the controller, and/or the non-volatile storage device proceed to power down 760.

As noted above, the computing machine can resume from the sleep state and transition to the power on state by the power source increasing an amount of power supplied to one or more components of the computing machine 770. The computing machine can resume from the sleep state in response to the processor, the controller, and/or the process application detecting a wake on event from a component of the computing machine or a user accessing the computing machine.

If the computing machine is not resuming from the sleep state, the processor, the controller, and/or the process application continue to determine whether the computing machine is resuming from the sleep state 770. If the computing machine is resuming from the sleep state, the processor and/or the controller can proceed to determine whether a flag is enabled on the non-volatile storage device 780. As noted above, the flag is enabled if the flag is marked or if a value of the flag is 1.

If the flag is not enabled the process is can be repeated and the processor, the controller, and/or the process application can proceed to load a BIOS and load an operating system, one or more threads, processes, and/or applications onto the memory of the computing machine. If the flag is enabled, the processor, the controller, and/or the process application can retrieve the process state from the non-volatile storage and proceed to write or load the process state back into the memory 790.

In one embodiment, the processor can initialize one or more components of the computing machine while the controller and/or a graphical processing unit of the controller retrieve and write the process state to the memory. In another embodiment, the processor can include a first core to retrieve and write the process state to memory, while one or more additional cores initialize the components of the computing machine. Using the loaded process state, the computing machine can resume operation of the computing machine. The method is then complete. In other embodiments, the method of FIG. 7 includes additional steps in addition to and/or in lieu of those depicted in FIG. 7.

What is claimed is:

1. A method for managing a computing machine comprising:
   powering a memory to retain a process state of the computing machine if the computing machine is in a sleep state, the sleep state comprising an S3 sleep state according to Advanced Configuration and Power Interface (ACPI) specifications;
   transferring the process state from the memory to a non-volatile storage device; and
   writing the process state from the non-volatile storage device to the memory if the computing machine is resuming to a power on state;
   wherein the computing machine remains in the S3 sleep state as the process state is transferred from the memory to the non-volatile storage device, and
   wherein the computing machine does not load a BIOS of the computing machine when resuming to the power on state.

2. The method for managing a computing machine of claim 1 wherein the process state of the computing machine is transferred from the memory to the non-volatile storage device after a predefined period of time.

3. The method for managing a computing machine of claim 1 further comprising powering down the memory in response to the process state being transferred from the memory to the non-volatile storage device.

4. The method for managing a computing machine of claim 3 further comprising enabling a flag in the non-volatile storage device in response to the process state being transferred to the non-volatile storage device.

5. The method for managing a computing machine of claim 4 further comprising determining whether the flag is enabled before writing the process state to the memory from the non-volatile storage if the computing machine is powering on.

6. A computing machine comprising:
   a memory to retain a process state of the computing machine if the computing machine is in a sleep state; and
   a non-volatile storage device to receive and store the process state from the memory; and
   a controller to transfer the process state from the memory to the non-volatile storage device after a predefined period of time if the computing machine remains in the sleep state;
   wherein the controller transfers the process state of the computing machine from the non-volatile storage device to the memory when the computing machine enters a power on state, the BIOS of the computing machine not being loaded when resuming to the power on state.

7. The computing machine of claim 6 wherein the controller and the memory power down in response to the process state being transferred to the non-volatile storage device.

8. The computing machine of claim 6 wherein the controller transfers the process state of the computing machine from the non-volatile storage device to the memory if the computing machine enters a power on state.

9. The computing machine of claim 8 wherein the controller includes a graphical processing unit of the computing machine.

10. The computing machine of claim 6 wherein the process state is stored in the non-volatile storage device as an image file.

11. The computing machine of claim 6 further comprising a power source to transition the computing machine between one or more power states.

12. The computing machine of claim 6 wherein the computing machine is in a S3 power state if in the sleep state.

13. The computing machine of claim 11 wherein the power source supplies power to the non-volatile storage device if the controller is transferring the process state from the memory to the non-volatile storage device.

14. A computer readable medium comprising instructions that if executed cause a processor to:
   power a memory to retain a process state of a computing machine if the computing machine is in a sleep state;
   transfer the process state from the memory to a non-volatile storage device if the computing machine is in the sleep state; and
   resume the computing machine to a power on state by transferring the process state from the non-volatile storage device the memory;
   wherein the processor includes a first core and at least one additional core, the first core transferring the process state of the computing machine from the non-volatile storage device to the memory in response to the computing machine resuming to the power on state and at least one of the additional cores initializing components of the computing machine in response to the computing machine resuming to the power on state.

15. The computer readable medium comprising instructions of claim 14 wherein the processor determines whether the process state is stored in the non-volatile storage device in response to the computing machine resuming to the power on state.

* * * * *